United States Patent
Look et al.

(10) Patent No.: US 12,437,760 B2
(45) Date of Patent: Oct. 7, 2025

(54) GENERATING AND/OR CAUSING RENDERING OF VIDEO PLAYBACK-BASED ASSISTANT SUGGESTION(S) THAT LINK TO OTHER APPLICATION(S)

(71) Applicant: GOOGLE LLC, Mountain View, CA (US)

(72) Inventors: Wendy Look, Zurich (CH); Evgeny Cherepanov, Adliswil (CH); Olga Kapralova, Bern (CH); Dan Vallejo, New York, NY (US); Mikhail Reutov, Zug (CH)

(73) Assignee: GOOGLE LLC, Mountain View, CA (US)

( * ) Notice: Subject to any disclaimer, the term of this patent is extended or adjusted under 35 U.S.C. 154(b) by 140 days.

(21) Appl. No.: 18/235,707

(22) Filed: Aug. 18, 2023

(65) Prior Publication Data
US 2024/0062757 A1 Feb. 22, 2024

Related U.S. Application Data

(60) Provisional application No. 63/399,105, filed on Aug. 18, 2022.

(51) Int. Cl.
*G10L 15/00* (2013.01)
*G06F 3/0482* (2013.01)
(Continued)

(52) U.S. Cl.
CPC ............ *G10L 15/22* (2013.01); *G06F 3/0482* (2013.01); *G06Q 10/1095* (2013.01);
(Continued)

(58) Field of Classification Search
CPC ............... G10L 15/22; G10L 2015/223; G10L 2015/221; G10L 15/222; G10L 2015/225;
(Continued)

(56) References Cited

U.S. PATENT DOCUMENTS 5,664,061 A * 9/1997 Andreshak ............... G06F 3/16
704/E15.04
6,654,721 B2 * 11/2003 Handelman ............ H04N 7/163
725/39

(Continued)

OTHER PUBLICATIONS

Liao, J., Karim, A., Jadon, S. S., Kazi, R. H., & Suzuki, R. (2022, October). RealityTalk: Real-time speech-driven augmented presentation for AR live storytelling. In Proceedings of the 35th annual ACM symposium on user interface software and technology (pp. 1-12). (Year: 2022).*

*Primary Examiner* — Edgar X Guerra-Erazo
(74) *Attorney, Agent, or Firm* — Gray Ice Higdon

(57) ABSTRACT

Implementations set forth herein relate to incorporating automated assistant suggestions into an interface of a video application, when the video application is rendering video content. The video content—as well as any relevant content, can provide a basis for the automated assistant suggestions. The assistant suggestions can optionally link to one or more additional applications, which can be controlled in response to a user selecting one or more of the automated assistant suggestions. In response to a selection of an assistant suggestion, resulting data generated by another application can be rendered over an interface of the video application, while video content is being rendered and/or otherwise played. This can allow the user to control relevant actions of other applications without completely leaving an interface of the video application, thereby preserving memory and other computational resources that may be consumed when switching between application interfaces.

20 Claims, 6 Drawing Sheets

(51) Int. Cl.
*G06Q 10/1093* (2023.01)
*G10L 15/22* (2006.01)
*H04N 21/431* (2011.01)
*H04N 21/472* (2011.01)

(52) U.S. Cl.
CPC ... *H04N 21/4316* (2013.01); *H04N 21/47217* (2013.01); *G10L 2015/223* (2013.01)

(58) Field of Classification Search
CPC ......... G10L 2015/226; G10L 2015/228; G10L 2015/227; G10L 17/02; G10L 17/10; G10L 17/08; G10L 17/24; G10L 17/22; G10L 17/26; G10L 25/03; G10L 25/30; G10L 25/27; G10L 25/54; G10L 25/57; G10L 25/60; G10L 2025/783; G10L 2025/786; G10L 25/78; G10L 25/81; G10L 25/84; G10L 25/87; H04N 21/4316; H04N 21/47217; H04N 21/47214; H04N 21/472; H04N 21/47202; H04N 21/47; H04N 21/4725; H04N 21/4722; H04N 21/4728; G06F 3/0482; G06F 3/04817; G06F 3/04815; G06F 3/0484; G06F 3/04842; G06F 3/04845; G06F 3/04847; G06F 3/0486; G06F 3/04855; G06F 3/04886; G06F 3/04897; G06F 18/40; G06F 3/0488; G06Q 10/1095

See application file for complete search history.

(56) References Cited

U.S. PATENT DOCUMENTS

| | | | |
|---|---|---|---|
| 9,378,740 B1* | 6/2016 | Rosen | G10L 15/1822 |
| 2015/0254057 A1* | 9/2015 | Klein | H04N 21/4668 |
| | | | 704/275 |
| 2015/0382047 A1* | 12/2015 | Van Os | H04N 21/41265 |
| | | | 725/38 |
| 2022/0102015 A1* | 3/2022 | Aoun | G16H 80/00 |

* cited by examiner

GENERATING AND/OR CAUSING RENDERING OF VIDEO PLAYBACK-BASED ASSISTANT SUGGESTION(S) THAT LINK TO OTHER APPLICATION(S)

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

An automated assistant may be accessible through a device, such as a cellular phone or a tablet device, that has a variety of other applications loaded onto the device. For instance, a user may access a particular application from their computing device and, simultaneously, issue a spoken utterance to the automated assistant to initialize performance of a particular action (e.g., finding directions to a nearby location). However, initializing performance of certain actions can interrupt current and/or forthcoming processes of the particular application. For instance, certain operating systems and/or applications may necessarily remove a graphical user interface (GUI) for the particular application from a display interface of the computing device to allow the automated assistant to render assistant content at the display interface. When, for example, the particular application is a video application rendering video content, initializing the automated assistant during video playback may cause a temporary loss of video data from a memory buffer of the computing device (e.g., when the automated assistant requests for other data to occupy the memory buffer). In some instances, this may necessitate that the user "refresh" the video application or otherwise cause the video application to re-download data corresponding to the video content, after their interaction with the automated assistant is completed.

SUMMARY

Implementations set forth herein relate to an automated assistant that can cause selectable assistant suggestions to be rendered at an application interface of a separate application, based on content being rendered and/or otherwise processed by the separate application. In some implementations, and with prior permission from a user(s), the assistant suggestions can be personalized for the user(s) interacting with the separate application. Alternatively, or additionally, the separate application can facilitate interactions between the user and the automated assistant, which can initialize—in response to a selection of an assistant suggestion—performance of one or more actions by another separate application.

For example, the automated assistant can operate on a computing device that also provides access to a video application and a navigation application. The video application can be utilized to view videos on the internet and/or stream live content, and the navigation application can be utilized to provide directions between two or more locations (e.g., a current location of a user and one or more additional different locations). When a user is viewing video content via the video application, the video content can be rendered at a first portion of a graphical user interface (GUI) of the video application. In some implementations, the video content and/or other related data (e.g., video title, description, comments, website information, etc.) can be processed, with prior permission from the user, for determining whether the video content is relevant to any assistant data that is accessible to the automated assistant. For example, the assistant data can characterize certain preferences and/or interests of the user (e.g., embodied in a knowledge graph), as identified by the automated assistant with prior permission from the user. In some implementations, the assistant data can include multiple different instances of data, and each instance of data can be based on a prior interaction between the user and the automated assistant.

For instance, an instance of the assistant data can indicate that the user had previously asked for a bus schedule from the automated assistant. The automated assistant may have fulfilled this request by initializing the navigation application using an address identified in the spoken utterance from the user, and causing the navigation application to render a map with a bus schedule at a nearby display interface of a computing device. In furtherance of the aforementioned example, when the user subsequently accesses the video application and views video content related to a particular nearby location, the automated assistant can determine that this prior interaction, which involved accessing a bus schedule, is relevant to the video content. In some implementations, a relevancy between one or more portions of video content and an instance of assistant data can be characterized by a relevancy metric (i.e., relevance data), which can be generated using one or more heuristic processes and/or using one or more trained machine learning models. The relevancy metric can be compared to a threshold and, when the threshold is satisfied, an assistant suggestion based on the instance of assistant data (e.g., data associated with the prior assistant interaction) can be rendered at the GUI of the video application.

For example, when the video content includes instructions for preparing a recipe, the assistant suggestion that is rendered can be a selectable element associated with the recipe. For instance, when the selectable element is selected, the automated assistant can initialize an action of interacting with the navigation application to provide directions to a nearby restaurant that provides the entrée corresponding to the recipe. In some implementations, the selectable element can be rendered with natural language content corresponding to a spoken utterance (e.g., "Show me nearby restaurants that make this.") that can be provided to cause the automated assistant to initialize performance of the action. Alternatively, or additionally, the selectable element can be rendered simultaneously to the video content being rendered at the GUI of the video application. For example, the video content can be rendered at a first portion of the GUI, and the selectable element can be rendered at a second portion of the GUI. In some implementations, in response to the user selecting the selectable element, application data generated by the navigation application can be rendered at a third portion of the video application. For example, the application data can be rendered to overlap the second portion of the GUI and/or the first portion of the GUI. In some implementations, the application data can be rendered simultaneous to the video content being rendered at the display interface.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
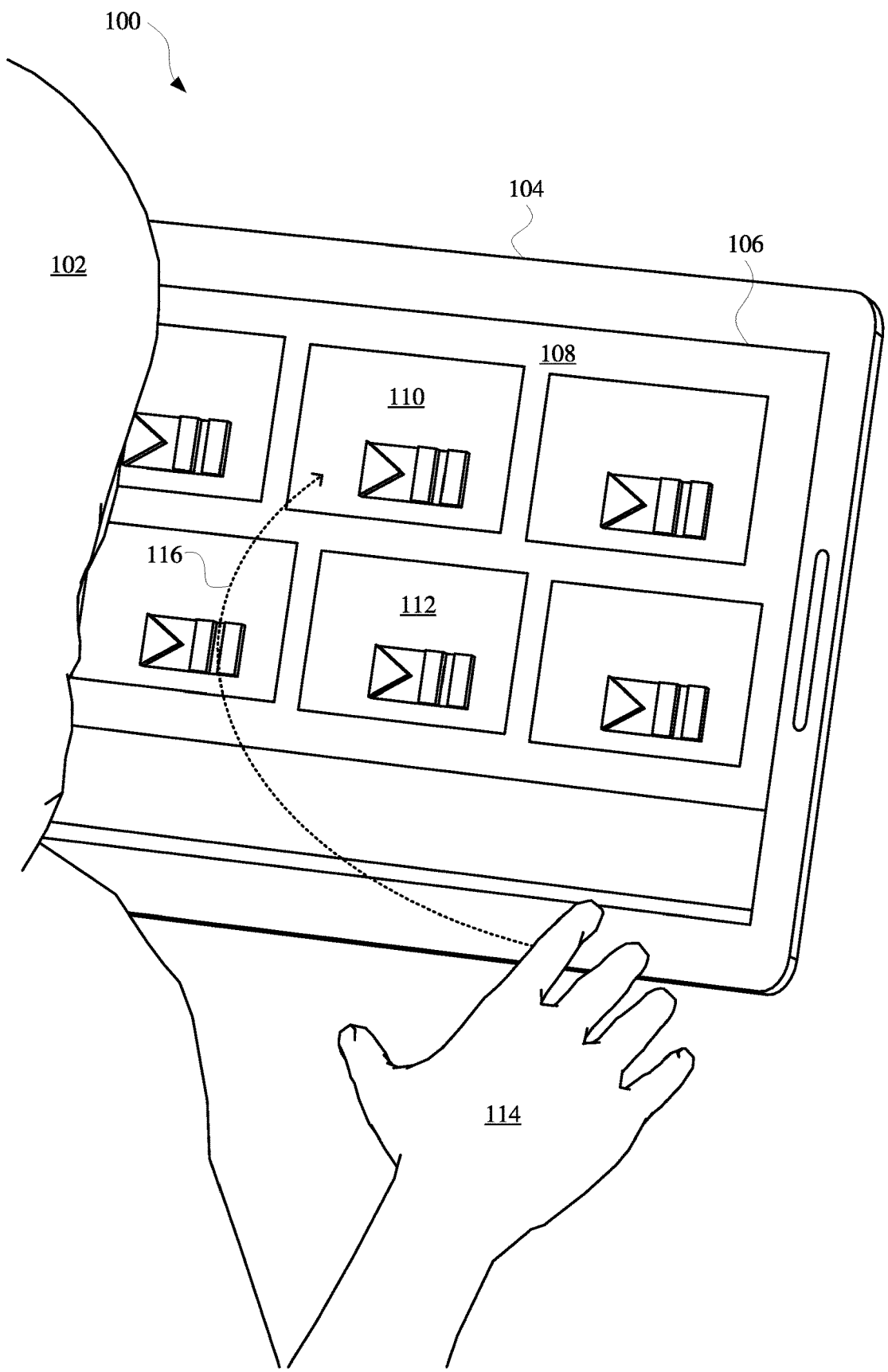
FIG. 1A, FIG. 1B, and FIG. 1C illustrate views of a user viewing a video application that can render selectable assistant suggestions based on video content, and without interrupting video playback.
Figure 1B:
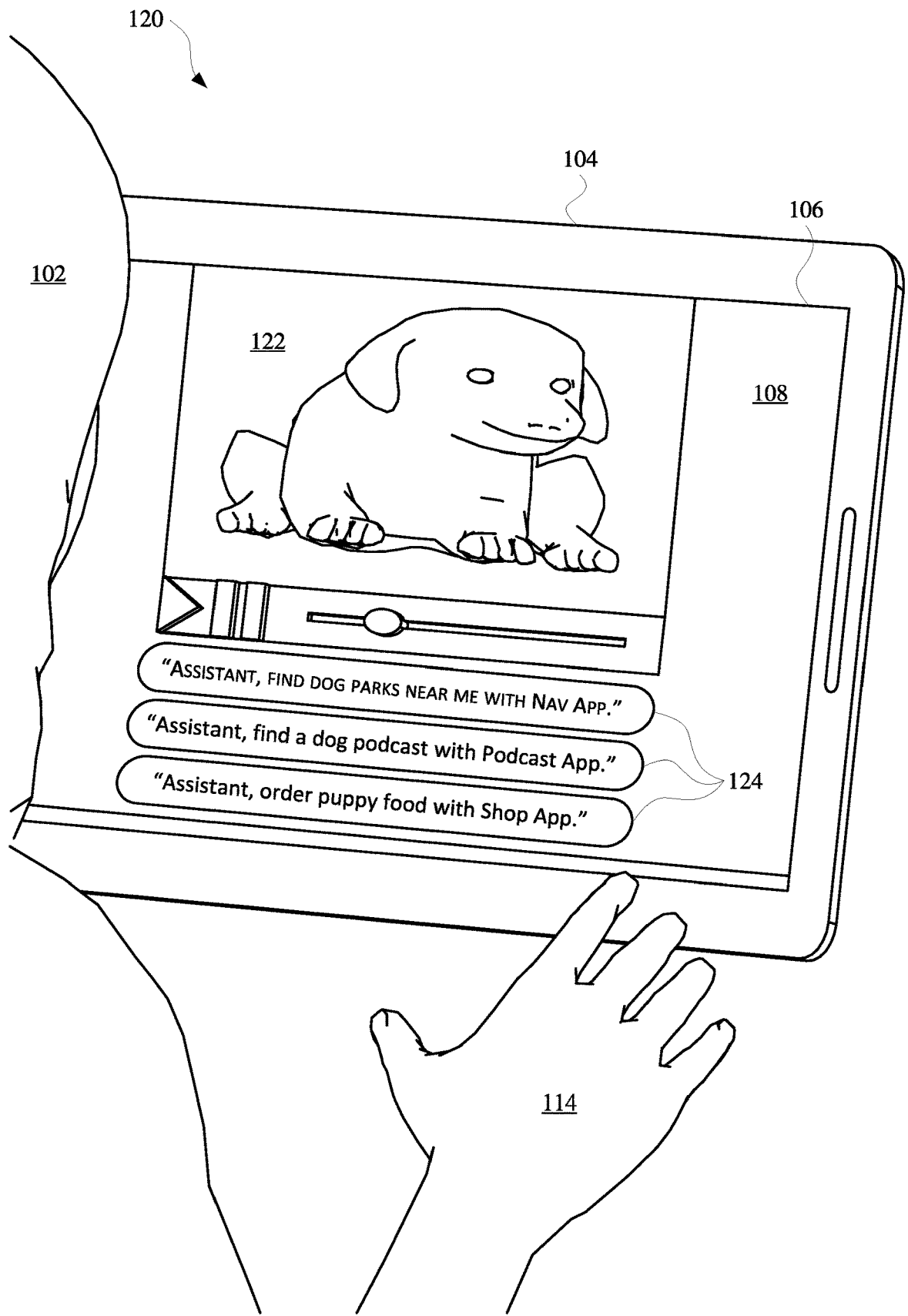
Figure 1C:
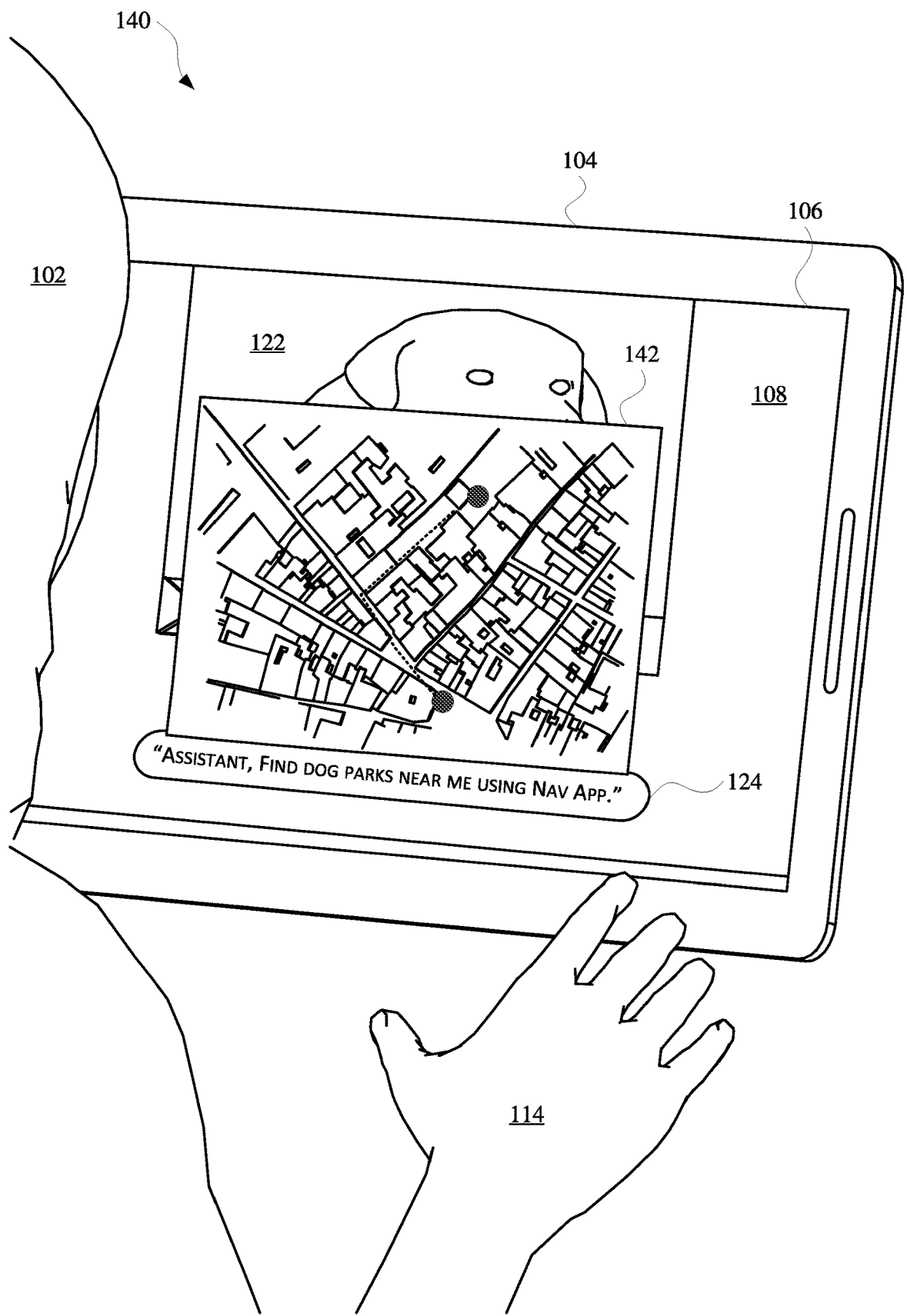

FIG. 1A, FIG. 1B, and FIG. 1C illustrate a view 100, a view 120, and a view 140 of a user 102 viewing a video application that can render selectable assistant suggestions based on video playback 122 and without interrupting video playback. Initially, the user 102 can optionally be viewing a graphical user interface (GUI) 108 of a video application. The GUI 108 can be rendered at a display interface 106 of a computing device 104, such as a tablet computer and/or any other computing device. When the user 102 is viewing the GUI 108 of the video application, the user 102 can select from a variety of different videos to view by selecting their corresponding selectable elements (e.g., a first video link 110, a second video link 112, etc.). When the user 102 selects to view a first video, by selecting the first video link 110 with their hand 114 (e.g., via a tap gesture 116 received at the display interface 106), the video application can cause playback of the first video to be initialized.

In some implementations, and with prior permission from the user 102, interactions between the computing device 104 and the user 102 can be communicated to an automated assistant, which is accessible via the computing device 104 and/or one or more other devices associated with the user 102. For instance, data communicated to the automated assistant can characterize an interaction in which the user 102 selected the first video link 110 instead of selecting the other video links being rendered (e.g., the second video link 112). This can indicate, to the automated assistant, a preference of the user 102 for certain content in this current context. Alternatively, or additionally, this data can provide further basis for the automated assistant to render subsequent assistant suggestions when the user 102 is viewing the video application.

In response to the user 102 selecting the first video link 110, the video application can cause video playback 122 to be initialized at the display interface 106 of the computing device 104. In some implementations, the automated assistant can determine content rendered at the display interface 106, with prior permission from the user 102. Alternatively, or additionally, the video application can provide the automated assistant with access to data that indicates the content being viewed by the user 102 and/or at the computing device 104, with prior permission from the user 102. In some implementations, content data characterizing the content being rendered at the display interface 106 can be processed using one or more heuristic processes and/or one or more trained machine learning models in furtherance of generating one or more selectable elements 124. The selectable elements 124 can correspond to actions that can be initialized by the automated assistant and fulfilled using one or more separate applications (e.g., application(s) that can be accessed separately from the automated assistant and the video application).

For example, the content data associated with the video content can be processed using one or more heuristic processes and/or one or more trained machine learning models for determining one or more actions to suggest to the user 102. For example, content data and/or contextual data (e.g., data characterizing a context in which the user 102 is viewing the video) can be processed to generate one or more embeddings that can be mapped to a latent space. Other embeddings mapped to the latent space can correspond to actions, applications, and/or other data that the user may be interested in, based on prior interactions between the user 102 (or other users) and the computing device 104 and/or other devices. A distance in latent space between the content data embedding, and/or contextual data embedding, and one or more embeddings corresponding to the actions, applications, and/or other data can be determined. When the distance corresponding to one or more content-based embeddings satisfies the distance threshold, the corresponding action(s), application(s), and/or other data can be utilized to generate one or more assistant suggestions.

For example, the assistant suggestions generated by the automated assistant based on the video playback 122 can be characterized by natural language content included with the selectable elements 124. When, for instance, the video playback 122 includes a dog, and the user 102 has previously accessed a navigation application, a dog podcast, and/or a shopping application, the selectable elements 124 can recommend that the user 102 "find [a] dog park" with their navigation application (i.e., "nav app"), listen to the dog podcast with their podcast application (i.e., "app"), and/or order puppy food with their shopping application (i.e., "shop app"). In some implementations, each selectable element 124 can be associated with an action intent and/or one or more slot values, which can be provided to a separate application. For example, in response to the user 102 selecting a particular selectable element 124, such as for "finding dog parks" with the "nav app," the video application can communicate the user selection to the automated assistant application. Alternatively, or additionally, the video application can communicate with the separate application that may correspond to the selectable element 124. In some implementations, a selectable element 124 can be selected by a spoken utterance, such as a spoken utterance that embodies the natural language content rendered with the selectable element 124. For example, the user 102 can provide a spoken utterance such as, "Assistant, find dog parks near me with Nav App," to select the second selectable element 124 rendered at the display interface 106.

In some implementations, when the user 102 selects a particular selectable element 124, selection data can be communicated from the video application to the automated assistant and/or separate application, which can process the selection data. The selection data can indicate the action intent(s) and/or slot value(s) associated with the particular selectable element, thereby allowing the separate application and/or automated assistant to initialize performance of one or more actions. For instance, in response to the user 102 selecting the "nav app" related selectable element 124, the navigation application installed at the computing device 104 can execute an action intent using slot values specified via the selectable element 124. The action intent can be, for example, a "search" action that has a slot value for specifying the term(s) to be searched (e.g., "dog parks near me"). Therefore, in response to the user selection, the navigation application can identify locations of nearby dog parks and generate a map of results for the "dog park" search query.

In some implementations, resulting data generated by the separate application can be communicated to the automated assistant and/or the video application for communicating to the user 102, while the user is viewing the video playback 122 and/or another interface of the video application. For example, a GUI based on the resulting data can be rendered at the display interface 106 of the computing device 104. For instance, the video playback 122 can be rendered at a first portion of the video application GUI, and the selectable elements 124 can be rendered at a second portion of the video application GUI, as illustrated in view 120 of FIG. 1B. A GUI 142 based on the resulting data can be rendered at a third portion of the video application GUI, which can at least partially overlap the first portion and/or the second portion of the video application GUI, as illustrated in view 140 of FIG. 1C. In some implementations, the resulting data can be generated as a GUI 142 that is interactive, such that the user 102 can interact with the separate application that provided the resulting data. For example, the GUI 142 can include one or more other selectable elements that, when selected, cause the separate application to perform a particular operation. In some implementations, the separate application can be initialized in response to another selectable element being selected, and the separate application can be rendered over a portion of the video application. For example, a portion of the display interface 106 can include the separate application, and another portion of the display interface 106 can include the video application. Alternatively, or additionally, when the user 102 interacts with the GUI 142, the video playback 122 can continue without pause or, the video playback 122 can at least temporarily pause until the interaction between the user 102 and the separate application is complete. When the interaction with the separate application is complete (e.g., the user 102 dismisses the GUI 142 and/or the separate application has completed an operation(s) at the direction of the user 102 and/or the automated assistant), the video application can cause the video playback 122 to proceed ("play") with, or without, the user 102 providing additional input to the video application.

Figure 2:
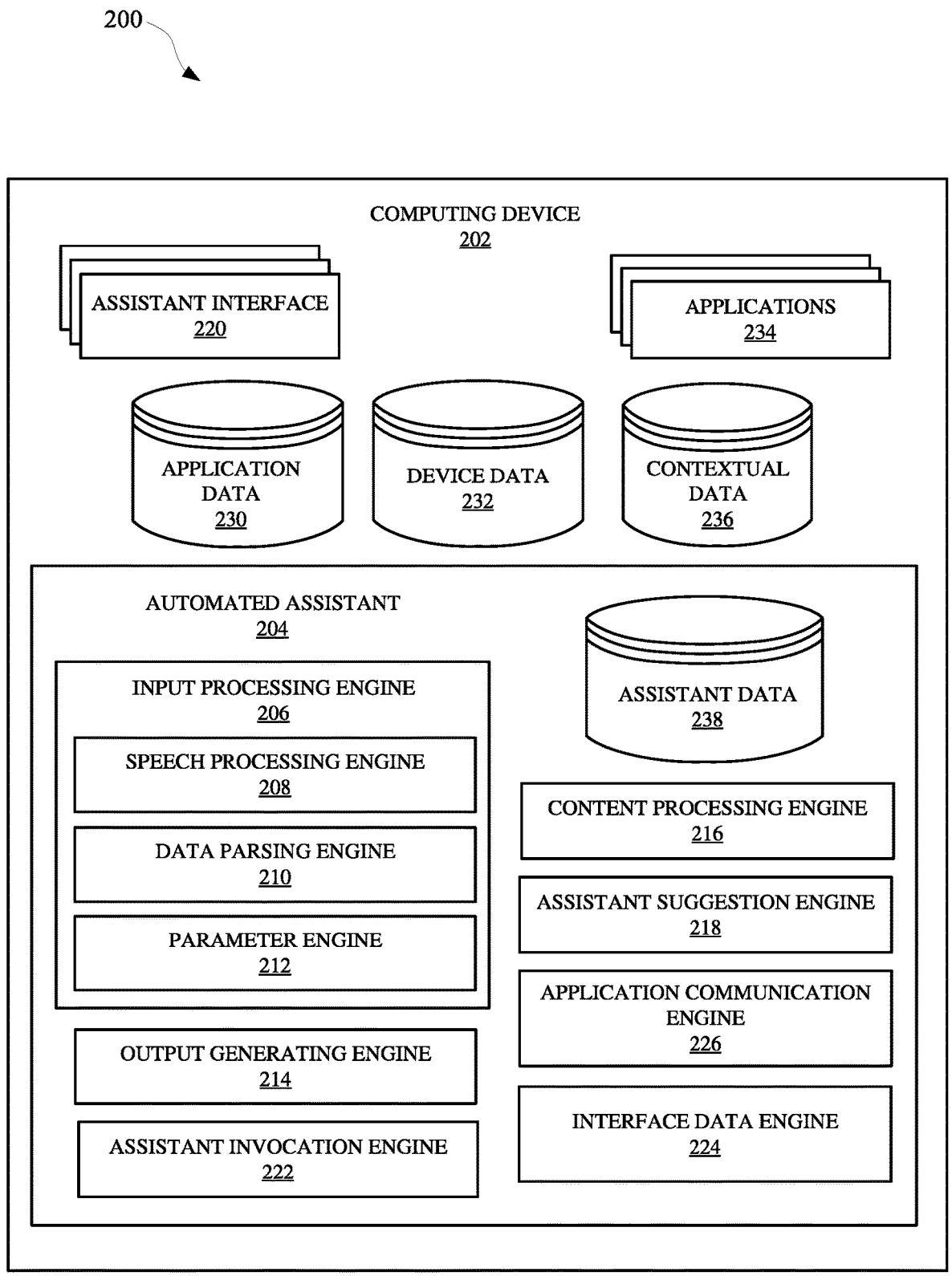
FIG. 2 illustrates a system for facilitating assistant suggestions at an interface of a video application and causing certain corresponding assistant suggestions to be fulfilled without navigating away from the video application.

FIG. 2 illustrates a system 200 for facilitating assistant suggestions at an interface of a video application and causing certain corresponding assistant suggestions to be fulfilled without navigating away from the video application. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can include a content processing engine 216 that can employ one or more heuristic processes and/or one or more trained machine learning models to process (with prior permission from the user) content that a user may be viewing (e.g., playback of a tourist destination video). The content processing engine 216 can process, for example, image frames, screenshots, audio data, image data, input data, output data, contextual data, and/or any other data that can be relevant to content being rendered at a device. In some implementations, content data 216 can be generated based on the content processing, and the content data can characterize one or more objects that may be represented by the video content (e.g. a name of a city and/or landmark). In some implementations, an assistant suggestion engine 218 of the system 200 can receive the content data and generate one or more assistant suggestions based on the content data.

For example, the content data can be processed using one or more heuristic processes and/or one or more trained machine learning models to determine other available data that may be relevant to the content data. In some implementations, relevance data can be generated for the content data and other available data (e.g., assistant data), and the relevance data can characterize relevance metrics that can correspond to instances of data that may be relevant to the content data. For example, an instance of data can be assistant data generated based on a prior interaction between the user, the automated assistant, and another application (e.g., a "Travel App"). When the relevance metric for this instance of data satisfies a threshold, the instance of data can be utilized as a basis for generating, by the assistant suggestion engine 218, assistant suggestion data.

In some implementations, the assistant suggestion data can characterize a suggestion for the automated assistant to communicate with an application that is accessible separately from the automated assistant and the video application. In such instances, the automated assistant 204 may communicate with the separate application to retrieve application data that may be relevant for rending a particular suggestion at an interface of the video application when video playback is still occurring. For example, the automated assistant can employ an application communication engine 226 to generate a request for the separate application. The request can solicit the separate application to provide, with prior permission from the user, data associated with a recent interaction between the user and the separate application (e.g., details regarding a trip to Louisville that the user started to book with the separate application). In this way, when the video content is relevant to the recent interaction, the user can be provided with selectable suggestions based on both the video content and relevant application data.

In response to the request, the separate application can provide application data, which the automated assistant 204 can optionally use to generate the assistant suggestion data. The assistant suggestion engine 218 can utilize an interface data engine 224 of the system 200 to cause the video application to render one or more selectable elements at an interface of the video application. In some implementations, the automated assistant 204 can utilize an API, and/or other protocol for communicating between applications, to cause the video application to render the selectable elements. When a user selects a particular selectable element (e.g., via touch input, spoken utterance, etc.), the application communication engine 226 can cause the automated assistant 204 and/or the corresponding separate application to initialize performance of one or more actions. For instance, when the video content relates to a vacation destination, and the separate application was recently utilized to book a trip to the vacation destination, the selectable suggestion that is rendered can correspond to a request for the automated assistant to assist with completing booking the trip.

For example, the selectable suggestion can include natural language content corresponding to a command phrase such as, "Assistant, complete my trip to Louisville with my Travel App." When the user is viewing the video playback and selects this selectable suggestion, the automated assistant 204 can be invoked and communicate with the Travel App, to cause the Travel App to provide resulting data for rendering an interface with which the user can continue booking the trip. In some implementations, the interface can be rendered over an interface and/or with an interface of the video application (e.g., the interface having the video playback), thereby allowing the user to view the video playback while also interfacing with the Travel App.

Figure 3:
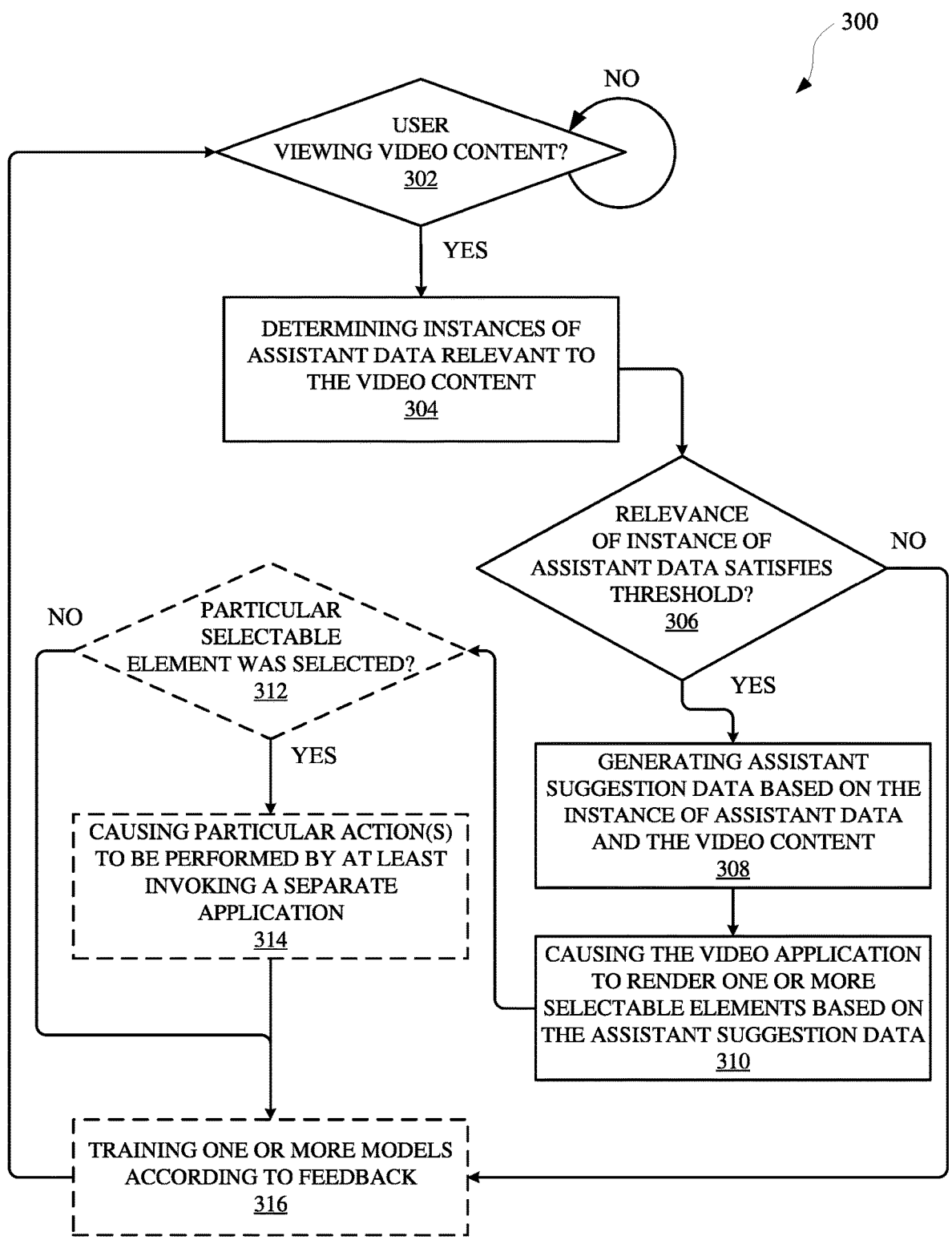
FIG. 3 illustrates a method for rendering, based on video content, selectable assistant suggestions at an interface of a video application, and causing an automated assistant to perform actions associated with the video content when one of the selectable suggestions is selected.

FIG. 3 illustrates a method 300 for rendering, based on video content, selectable assistant suggestions at an interface of a video application, and causing an automated assistant to perform actions associated with the video content when one of the selectable suggestions is selected. The method 300 can be performed by one or more computing devices, applications, and/or any other apparatus or module that can be associated with an automated assistant. The method 300 can include an operation 302 of determining whether a user is viewing video content (e.g., video of a concert with a laser show) via a GUI of a video application. The user can access the video application via a computing device, which can also provide access to an automated assistant and one or more other applications. Each of these applications can be accessed separately—however, in some implementations, certain applications can communicate with each other to facilitate performance of certain actions. For example, one or more different application programming interfaces (APIs) can be utilized by the automated assistant and/or the video application to facilitate interactions between the video application and the automated assistant. When the user is viewing video content via the GUI of the video application, the automated assistant can determine, with prior permission from the user, the video content being viewed using one or more APIs. Alternatively, or additionally, the automated assistant can, with prior permission from the user, utilize one or more heuristic processes and/or trained machine learning models to process image frames of a video, screenshots, and/or other device outputs for determining an application and/or content being rendered at an interface of the computing device.

The method 300 can proceed from the operation 302 to an operation 304, which can include identifying instances of assistant data that is relevant to the video content. In some implementations, the assistant data can be generated based on prior interactions between one or more users and one or more automated assistants, with prior permission from the one or more users. For example, the assistant data can be part of a knowledge graph that can characterize various interests of the user, with prior permission from the user. Alternatively, or additionally, the assistant data can indicate data that may be associated with the user, based on prior interactions in which the user caused the automated assistant to interact with a separate application. For instance, the user may have previously provided a spoken utterance (e.g., "Book concert tickets for tomorrow's laser show.") that caused the automated assistant to interact with a music application, a calendar application, and/or any other application (e.g., a messaging application). The assistant data can therefore characterize features of this interaction such as, but not limited to, the spoken utterance provided, the application utilized by the automated assistant, data resulting from the interaction (e.g., details regarding the scheduled event), contextual data associated with the interaction (e.g., time and location for the interaction, time and location for the event), and/or any other data that can be associated with an application.

When relevant assistant data is determined at the operation 304, the method 300 can proceed to an operation 306, which can include determining a degree of relevance for each instance of data of the assistant data. In some implementations, one or more heuristic processes and/or one or more trained machine learning models can be utilized to determine a relevance of each instance of data to the video content. For example, one or more trained machine learning models can be utilized to generate an embedding that can be mapped to a latent space. Another embedding can also be generated for the video content, and/or a portion of the video content (e.g., one or more image frames and/or audio), and can also be mapped to the latent space. A distance in latent space between the embeddings can then be determined as a basis for generating a relevance metric for the instance of assistant data relative to the video content. One or more corresponding relevance metrics can then be compared to a relevance threshold and, when a particular relevance metric satisfies the relevance threshold, the method 300 can proceed to an operation 308 for that particular instance of assistant data (or multiple instances). Otherwise, the method 300 can return to the operation 302 and/or optionally proceed to an operation 316 of training one or more models according to feedback generated during execution of the method 300.

The operation 308 can include generating assistant suggestion data based on the instance of assistant data and the video content. In some implementations, the assistant suggestion data can characterize an action that can be performed by the automated assistant in coordination with another application that is accessible separately from the automated assistant and the video application. For example, the user can be viewing video content associated with a laser show (e.g., a music concert with a laser show) and the instance of assistant data that is identified can be based on a prior interaction in which the user asked the automated assistant to book laser show tickets using a music application. Based on this context for the currently streaming video content, the assistant suggestion data can refer to an action of booking, using the music application (or any other suitable application such as the calendar application, messaging application, navigation application, etc.), tickets for an upcoming laser that is coming to a city in which the user lives. In some implementations, details regarding the upcoming laser show can be identified through an internet search, public knowledge graph, and/or any other source of information that can correlate certain terms to nearby events. The assistant suggestion data can also characterize natural language content that refers to a request that can be submitted to the automated assistant to initialize performance of the action of booking the tickets. For instance, the natural language content can include "Find upcoming laser shows near me," and optionally include a graphical reference (e.g., text or image) to the music application.

In some implementations, a variety of different suggestions can be generated and ranked according to whether the user is estimated to find them valuable. For instance, the assistant suggestion for finding upcoming laser shows can be considered more valuable (e.g., correspond to a more valuable metric) than another assistant suggestion for "Buy a laser night light in my shopping application." As a result, the automated assistant may not communicate the "shopping" suggestion to the video application via an API but, rather, communicate the "ticket booking" suggestion to the video application.

The method 300 can proceed from the operation 308 to an operation 310 of causing the video application to render one or more selectable elements based on the assistant suggestion data. The automated assistant and/or video application can cause the one or more selectable elements to be rendered at the GUI of the video application when the video application is also rendering the video content (e.g., the same or a different portion of a video). In some implementations, the video content can be rendered at a first portion of the interface of the video application and the one or more selectable elements can be rendered at a second portion of the video application that is different from the first portion. In some implementations, the second portion can at least partially overlap the first portion when the one or more selectable elements are being rendered at the interface of the video application.

The method 300 can proceed from the operation 310 to an optional operation 312, which can include determining whether a particular selectable element was selected. When a particular selectable element has been selected (e.g., the selectable element corresponding to finding upcoming laser shows or any other selectable element), the method 300 can optionally proceed from the operation 312 to an operation 314. Otherwise, when a particular selectable element has not been selected (e.g., during a time in which the user is viewing the interface of the video application), the method 300 can proceed to the operation 316.

The operation 314 can include causing one or more particular actions corresponding to the selected element to be performed by at least invoking a separate application. In some implementations, the operation 314 can be performed by causing the video application to communicate selection data to the automated assistant for indicating the particular selectable element that was selected. Based on the selection data, the automated assistant can communicate action data to a separate application, for performing one or more particular actions. For example, the automated assistant can communicate action data that characterizes an action of searching for "laser shows nearby" in a search field of the music application. Alternatively, or additionally, the action data can refer to a particular "show" that was identified by the music application for the automated assistant to suggest to the user. In other words, separate applications can "offer" suggested actions to the automated assistant, based on contextual data (e.g., the user viewing a laser show on a video application) provided by the automated assistant to the separate applications (with prior permission from the user).

The method 300 can optionally proceed from the operation 314 to an optional operation 316 of training one or more models according to any feedback received from the user and/or automated assistant during execution of the method 300. For instance, training data can be generated based on one or more selectable elements being selected by the user, and/or one or more other selectable elements not being selected by the user. The training data can be based on the selectable elements that were suggested to the user and/or the context in which the selectable elements were suggested to the user. In this way, subsequent suggestions can be rendered, or not rendered, based on preferences of the user (with prior permission from the user) in certain contexts.

Figure 4:
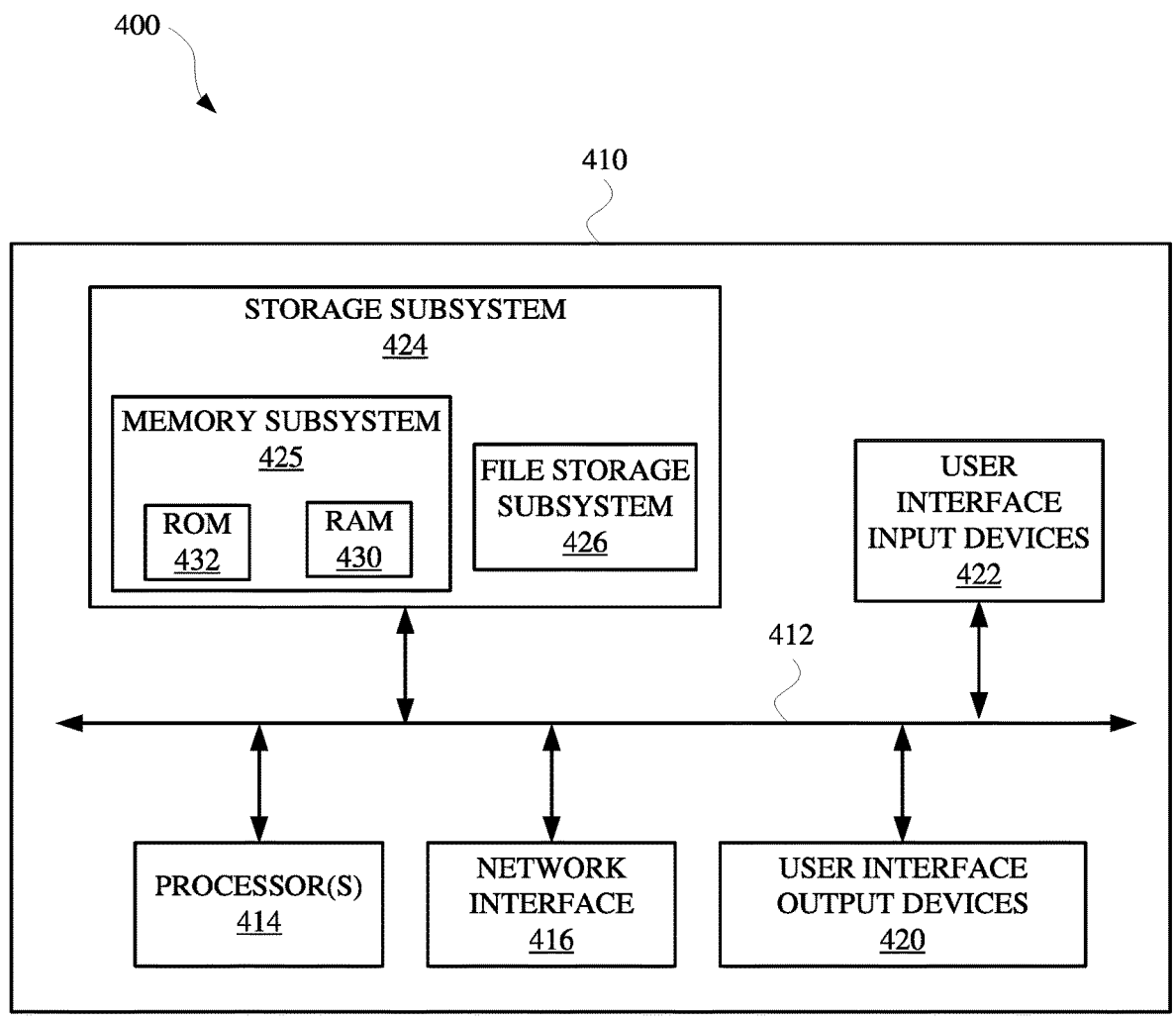
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a current location of the user), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as, determining, by an automated assistant, that a user is viewing video content that is being rendered at a display interface of a computing device, wherein the video content is rendered by a video application that is a separate application from the automated assistant. The method can further include determining, by the automated assistant, that the video content being rendered by the video application is relevant to assistant data, and that the assistant data is being stored in association with the user. The method can further include generating, by the automated assistant, assistant suggestion data based on the assistant data that is associated with the video content, wherein the assistant suggestion data characterizes one or more actions capable of being performed by the automated assistant using the assistant data. The method can further include causing, by the automated assistant and based on the assistant suggestion data, the video application to render one or more corresponding selectable elements at a graphical user interface (GUI) of the video application, wherein a selection of a particular selectable element of the one or more selectable elements causes the automated assistant to perform a particular action of the one or more actions using certain data of the assistant data.

In some implementations, determining that the video application is rendering the video content that is relevant to the assistant data includes: processing, using one or more trained machine learning models, one or more images that capture the video content being rendered at the display interface of the computing device. In some implementations, the method can further include providing, by the automated assistant, a request for data to one or more additional applications based on the assistant data being relevant to the video content, wherein, in response to receiving the request for data, an additional application of the one or more additional applications provides resulting data that characterizes an action that is associated with the assistant data and capable of being performed by the additional application, and wherein the assistant suggestion data is generated further based on the resulting data from the additional application.

In some implementations, the one or more selectable elements are rendered while an image frame of the video content is rendered at the display interface of the computing device. In some implementations, the method can further include, prior to the user viewing the video content that is being rendered at the display interface of the computing device, generating, by the automated assistant, the assistant data based on an interaction between the user and the automated assistant. In some implementations, the method can further include determining, by the automated assistant, that the particular selectable element of the one or more selectable elements was selected via the GUI of the video application; and performing, by the automated assistant, the particular action of the one or more actions using the certain data of the assistant suggestion data, wherein the particular action includes communicating the certain data to a particular application that is different from the automated assistant and that is different than the video application. In some implementations, the particular application includes a messaging application and the certain data includes a request for the messaging application to create a draft message. In some implementations, the particular application is a calendar application and the certain data includes a request for the calendar application to create a calendar event.

In other implementations, a method implemented by one or more processors is set forth as including operations such as causing, by a video application, a first portion of an application interface of the video application to provide playback of video content, wherein the video content is rendered at a display interface of a computing device. The method can further include receiving, based on the playback of the video content, assistant data that characterizes an action that can be initialized by an automated assistant, which is separate from the video application, wherein the action is associated with the video content, and a user who is associated with the automated assistant. The method can further include causing a second portion of the application interface of the video application to render a selectable element that, when selected, causes the automated assistant to initialize performance of the action, wherein the automated assistant is accessible separately from the video application. The method can further include receiving, by the video application, a selection of the selectable element, wherein the selection is received via an interface of the computing device, which provides access to the video application and the automated assistant. The method can further include causing, based on the selection of the selectable element, the automated assistant to initialize performance of the action, wherein performance of the action involves the automated assistant communicating with an additional application that is separate from the automated assistant and that is also separate from the video application.

In some implementations, the method can further include causing, based on the selection of the selectable element, the video application to render a third portion of the application interface at the display interface of the computing device, wherein the third portion of the application interface includes application data generated by the additional application. In some implementations, causing the video application to render the third portion of the application interface includes: causing the third portion of the application interface to at least partially overlap the second portion of the application interface. In some implementations, causing the video application to render the third portion of the application interface includes: causing the playback of the video content to at least temporarily pause; and causing the third portion of the application interface to at least partially overlap the first portion and the second portion of the application interface. In some implementations, the additional application is a navigation application and the application data includes a map of a location associated with the video content and a user.

In yet other implementations, a method implemented by one or more processors is set forth as including operations such as determining, by an automated assistant, that video content is being rendered at a display interface of a computing device for a user, wherein the video content is rendered by a video application that is a separate application from the automated assistant. The method can further include generating, based on the video content, relevance data that characterizes relevance of the video content to assistant data that is associated with the user, wherein the assistant data includes multiple different instances of data that are associated with the user, and the relevance data indicates a relevance of at least one instance of data, of the multiple different instances of data, to the video content. The method can further include determining whether the relevance of the at least one instance of data to the video content satisfies a relevance threshold. The method can further include, when the relevance of the at least one instance of data satisfies the relevance threshold: causing a portion of a graphical user interface (GUI) of the video application to render one or more selectable elements based on the at least one instance of data, wherein a selection of a particular selectable element of the one or more selectable elements causes the automated assistant to initialize performance of one or more actions using the at least one instance of data.

In some implementations, the at least one instance of data includes a current location of the computing device, and the method further comprises: determining, by the automated assistant, that the user selected the particular selectable element of the one or more selectable elements, and causing, in response to the particular selectable element being selected, the computing device to render directions from the current location to a different location that is associated with the video content. In some implementations, causing the computing device to render the directions from the currently location to the different location includes: causing the video application to render the directions at a graphical user interface (GUI) that at least partially overlaps a video playback GUI that includes the video content. In some implementations, generating the relevance data that characterizes relevance of the video content to the assistant data includes: determining that the multiple different instances of data are associated with the video content and one or more prior interactions between the user and the automated assistant.

In some implementations, the one or more prior interactions between the user and the automated assistant includes an interaction during which the automated assistant provided the user with assistant content associated with an object represented in the video content. In some implementations, causing a portion of a graphical user interface (GUI) of the video application to render one or more selectable elements based on the at least one instance of data includes: causing the particular selectable element to be rendered with natural language content corresponding to a command phrase that, when provided as a spoken utterance by the user to the automated assistant, causes the automated assistant to initialize performance of the one or more actions corresponding to the particular selectable element. In some implementations, causing a portion of a graphical user interface (GUI) of the video application to render one or more selectable elements based on the at least one instance of data includes: causing the particular selectable element to be rendered with image content that indicates the particular selectable element is associated with the automated assistant and/or a separate application.

We claim:

1. A method implemented by one or more processors, the method comprising:
   determining, by an automated assistant, that a user is viewing video content that is being rendered at a display interface of a computing device,
   wherein the video content is rendered by a video application that is a separate application from the automated assistant;
   determining, by the automated assistant, that the video content being rendered by the video application is relevant to assistant data, and that the assistant data is being stored in association with the user;
   generating, by the automated assistant, assistant suggestion data based on the assistant data that is associated with the video content,
   wherein the assistant suggestion data characterizes one or more actions capable of being performed by the automated assistant using the assistant data; and
   causing, by the automated assistant and based on the assistant suggestion data, the video application to render one or more corresponding selectable elements at a graphical user interface (GUI) of the video application,
   wherein a selection of a particular selectable element of the one or more selectable elements causes the automated assistant to perform a particular action of the one or more actions using certain data of the assistant data.

2. The method of claim 1, wherein determining that the video application is rendering the video content that is relevant to the assistant data includes:
   processing, using one or more trained machine learning models, one or more images that capture the video content being rendered at the display interface of the computing device.

3. The method of claim 1, further comprising:
   providing, by the automated assistant, a request for data to one or more additional applications based on the assistant data being relevant to the video content,
   wherein, in response to receiving the request for data, an additional application of the one or more additional applications provides resulting data that characterizes an action that is associated with the assistant data and capable of being performed by the additional application, and
   wherein the assistant suggestion data is generated further based on the resulting data from the additional application.

4. The method of claim 1, wherein the one or more selectable elements are rendered while an image frame of the video content is rendered at the display interface of the computing device.

5. The method of claim 1, further comprising:
   prior to the user viewing the video content that is being rendered at the display interface of the computing device:
   generating, by the automated assistant, the assistant data based on an interaction between the user and the automated assistant.

6. The method of claim 1, further comprising:
   determining, by the automated assistant, that the particular selectable element of the one or more selectable elements was selected via the GUI of the video application; and
   performing, by the automated assistant, the particular action of the one or more actions using the certain data of the assistant suggestion data,
   wherein the particular action includes communicating the certain data to a particular application that is different from the automated assistant and that is different than the video application.

7. The method of claim 6, wherein the particular application includes a messaging application and the certain data includes a request for the messaging application to create a draft message.

8. The method of claim 6, wherein the particular application is a calendar application and the certain data includes a request for the calendar application to create a calendar event.

9. A method implemented by one or more processors, the method comprising:

causing, by a video application, a first portion of an application interface of the video application to provide playback of video content,
  wherein the video content is rendered at a display interface of a computing device;
receiving, based on the playback of the video content, assistant data that characterizes an action that can be initialized by an automated assistant, which is separate from the video application,
  wherein the action is associated with the video content, and a user who is associated with the automated assistant;
causing a second portion of the application interface of the video application to render a selectable element that, when selected, causes the automated assistant to initialize performance of the action,
  wherein the automated assistant is accessible separately from the video application;
receiving, by the video application, a selection of the selectable element,
  wherein the selection is received via an interface of the computing device, which provides access to the video application and the automated assistant; and
causing, based on the selection of the selectable element, the automated assistant to initialize performance of the action,
  wherein performance of the action involves the automated assistant communicating with an additional application that is separate from the automated assistant and that is also separate from the video application.

10. The method of claim 9, further comprising:
causing, based on the selection of the selectable element, the video application to render a third portion of the application interface at the display interface of the computing device,
  wherein the third portion of the application interface includes application data generated by the additional application.

11. The method of claim 10, wherein causing the video application to render the third portion of the application interface includes:
causing the third portion of the application interface to at least partially overlap the second portion of the application interface.

12. The method of claim 10, wherein causing the video application to render the third portion of the application interface includes:
causing the playback of the video content to at least temporarily pause; and
causing the third portion of the application interface to at least partially overlap the first portion and the second portion of the application interface.

13. The method of claim 10, wherein the additional application is a navigation application and the application data includes a map of a location associated with the video content and a user.

14. A method implemented by one or more processors, the method comprising:
determining, by an automated assistant, that video content is being rendered at a display interface of a computing device for a user,
  wherein the video content is rendered by a video application that is a separate application from the automated assistant;
generating, based on the video content, relevance data that characterizes relevance of the video content to assistant data that is associated with the user,
  wherein the assistant data includes multiple different instances of data that are associated with the user, and the relevance data indicates a relevance of at least one instance of data, of the multiple different instances of data, to the video content;
determining whether the relevance of the at least one instance of data to the video content satisfies a relevance threshold; and
when the relevance of the at least one instance of data satisfies the relevance threshold:
  causing a portion of a graphical user interface (GUI) of the video application to render one or more selectable elements based on the at least one instance of data,
    wherein a selection of a particular selectable element of the one or more selectable elements causes the automated assistant to initialize performance of one or more actions using the at least one instance of data.

15. The method of claim 14, wherein the at least one instance of data includes a current location of the computing device, and the method further comprises:
determining, by the automated assistant, that the user selected the particular selectable element of the one or more selectable elements, and
causing, in response to the particular selectable element being selected, the computing device to render directions from the current location to a different location that is associated with the video content.

16. The method of claim 15, wherein causing the computing device to render the directions from the current location to the different location includes:
causing the video application to render the directions at a graphical user interface (GUI) that at least partially overlaps a video playback GUI that includes the video content.

17. The method of claim 14, wherein generating the relevance data that characterizes relevance of the video content to the assistant data includes:
determining that the multiple different instances of data are associated with the video content and one or more prior interactions between the user and the automated assistant.

18. The method of claim 17, wherein the one or more prior interactions between the user and the automated assistant includes an interaction during which the automated assistant provided the user with assistant content associated with an object represented in the video content.

19. The method of claim 15, wherein causing a portion of a graphical user interface (GUI) of the video application to render one or more selectable elements based on the at least one instance of data includes:
causing the particular selectable element to be rendered with natural language content corresponding to a command phrase that, when provided as a spoken utterance by the user to the automated assistant, causes the automated assistant to initialize performance of the one or more actions corresponding to the particular selectable element.

20. The method of claim 15, wherein causing a portion of a graphical user interface (GUI) of the video application to render one or more selectable elements based on the at least one instance of data includes:

causing the particular selectable element to be rendered with image content that indicates the particular selectable element is associated with the automated assistant and/or a separate application.

* * * * *